(12) United States Patent
Bertolini

(10) Patent No.: US 10,807,662 B2
(45) Date of Patent: Oct. 20, 2020

(54) METHOD OF PRODUCING A CROSS CAR BEAM UTILIZING NET, FORM AND PIERCE TECHNOLOGY

(71) Applicant: FORD GLOBAL TECHNOLOGIES, LLC, Dearborn, MI (US)

(72) Inventor: Caio Vinicius Bertolini, Lauro de Freitas (BR)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/818,365

(22) Filed: Nov. 20, 2017

(65) Prior Publication Data
US 2019/0152547 A1 May 23, 2019

(51) Int. Cl.
| B62D 65/02 | (2006.01) |
| B62D 41/00 | (2006.01) |
| B23B 35/00 | (2006.01) |
| B62D 27/02 | (2006.01) |
| B62D 25/14 | (2006.01) |

(52) U.S. Cl.
CPC ............ B62D 65/028 (2013.01); B23B 35/00 (2013.01); B62D 41/00 (2013.01); B62D 65/026 (2013.01); B62D 25/145 (2013.01); B62D 27/02 (2013.01)

(58) Field of Classification Search
CPC ... B23P 2700/50; B62D 41/00; B62D 65/028; B62D 65/02; B62D 65/026; B62D 27/02; B23B 35/00; B23B 2270/00
See application file for complete search history.

(56) References Cited

U.S. PATENT DOCUMENTS

| 3,712,529 | A | * | 1/1973 | Ozawa | B23K 9/0256 |
| | | | | | 228/44.3 |
| 5,380,978 | A | | 1/1995 | Pryor | |
| 6,139,082 | A | | 10/2000 | Davis, Jr. et al. | |
| 7,024,032 | B2 | | 4/2006 | Kidd et al. | |
| 7,048,325 | B1 | | 5/2006 | Sandhu | |
| 7,913,370 | B2 | | 3/2011 | Savoy | |
| 2014/0053501 | A1 | * | 2/2014 | Hauta-Aho | B23K 31/022 |
| | | | | | 52/836 |
| 2018/0208328 | A1 | * | 7/2018 | Charlton | B64F 5/10 |

FOREIGN PATENT DOCUMENTS

JP 5074399 B2 11/2012

OTHER PUBLICATIONS

English Machine Translation of JP5074399B2.

* cited by examiner

*Primary Examiner* — Christopher J Besler
(74) *Attorney, Agent, or Firm* — David Coppiellie; King & Schickli, PLLC

(57) ABSTRACT

A method is provided for producing an assembled cross car beam. That method includes the steps of assembling component parts together to produce an assembled cross car beam, scanning and measuring, by a scanning device the assembled cross car beam and creating component locators in correct positions on the assembled cross car beam for the subsequent installation of component parts such as AHU and instrument panel components.

9 Claims, 2 Drawing Sheets

METHOD OF PRODUCING A CROSS CAR BEAM UTILIZING NET, FORM AND PIERCE TECHNOLOGY

TECHNICAL FIELD

Figure 1:
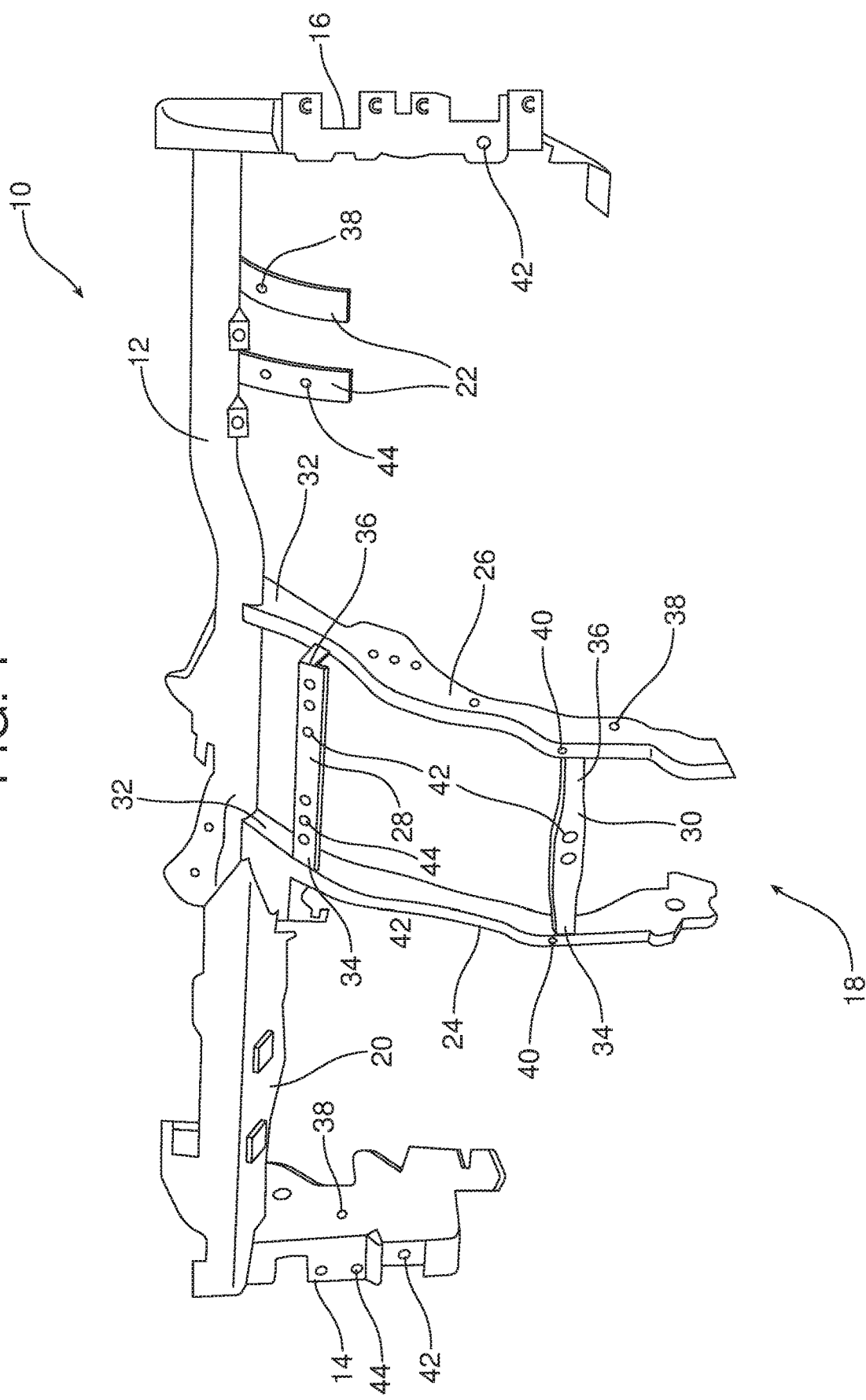

This document relates generally to the motor vehicle part manufacturing field and, more particularly, to a new and improved method for producing a cross car beam utilizing net, form and pierce techniques.

BACKGROUND

A cross car beam is a structural assembly extending from the right side of the motor vehicle to the left side of the motor vehicle that supports and is concealed by the instrument panel. Typically a cross car beam is built of steel using tubular forms and stamped brackets joined together using metal inert gas (MIG) welding. The additive effect of manufacturing tolerances that result during the assembly of the cross car beam from the various component parts may be substantial and is difficult to control. The resulting variations in the assembled cross car beam migrate to the instrument panel which is the most visible part of the vehicle interior. As a result it should be appreciated the differences and variations in a cross car beam may cause squeaks as well as assembly and poor fit and finish issues on the instrument panel, especially due to poor localization geometric dimensioning and tolerancing (GD&T), deformation and misalignment of the plastic parts attached to the cross car beam. Cross car beam dimensions and variations may also influence center console positioning, assembly and fit and finish issues with respect to shifter and other interface parts.

This document relates to a new and improved method for manufacturing a cross car beam wherein net, form and pierce techniques are utilized to cut component locator holes in the cross car beam after the various components had been put together to produce the assembled cross car beam. This allows adjustment for the additive effects of manufacturing tolerance stack-up resulting in a substantial reduction in variation so as to provide better fit and finish for the instrument panel and air handling unit while reducing squeaks and rattles.

SUMMARY

In accordance with the purposes and benefits described herein, a method is provided for producing a cross car beam. That method comprises the steps of: (a) assembling component parts to produce an assembled cross car beam, (b) scanning and measuring, by a scanning device, the assembled cross car beam and (c) creating component locators in correct positions in the assembled cross car beam. The component locators are utilized to mount downstream components, such as air handling unit (AHU) and instrument panel (IP) components to the cross car beam. This substantially reduces the added effect of variations due to manufacturing tolerances associated with the various component parts utilized to assemble the cross car beam. As a result, air handling unit and instrument panel fit and finish is enhanced.

The method may further include the step of comparing, by a controller, the assembled cross car beam to a reference standard and identifying the correct positions for the component locators. Further, the step of creating component locators may include cutting component locator holes in the assembled cross car beam at the correct positions.

The step of assembling the component parts may include the step of loading the component parts into a jig. Further, the step of assembling component parts may include welding the component parts together.

The method may further include the step of producing the component parts with self-locators for properly positioning component parts in a jig during the assembling of the component parts together to produce the assembled cross-car beam. In addition, the method may include the step of producing the component parts without the component locators during the assembling of the component parts together to produce the assembled cross car beam.

The method may also include the step of using a laser scanner to scan and measure the assembled cross car beam. Further, the method may include the step of using a net, form and pierce process to create the component locators in the assembled cross car beam.

Stated another way and in accordance with an additional aspect, a method comprises the steps of assembling component parts together to produce an assembled cross car beam and creating component locators in the assembled cross car beam using a net, form and pierce process. That method may further include the step of scanning and measuring, by a scanning device, the assembled cross car beam. Further, the method may include the step of comparing, by a controller, the assembled cross car beam to a reference standard and identifying correct positions for the component locators.

Still further, the step of assembling the component parts may include the steps of loading the component parts into a jig and welding the component parts together.

In addition, the method may include the step of producing the component parts with self-locators for properly positioning the component parts in the jig during the assembling of the component parts together to produce the assembled cross car beam. Further, the method may include the step of producing the component parts without the component locators during the assembling of the component parts together to produce the assembled cross car beam.

In the following description, there are shown and described several preferred embodiments of the method. As it should be realized, the method is capable of other, different embodiments and its several details are capable of modification in various, obvious aspects all without departing from the method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method and the cross car beam and together with the description serve to explain certain principles thereof. In the drawing figures:

FIG. 1 is a perspective view of an assembled cross car beam including self-locators, incorporated into the component parts before being assembled to produce the assembled cross car beam, and component locators for locating downstream component parts, such as air handling unit and instrument panel component parts, in correct positions on the assembled cross car beam. These additional component locators are added by net, form and pierce tool techniques following the assembly of the cross car beam.

Figure 2:
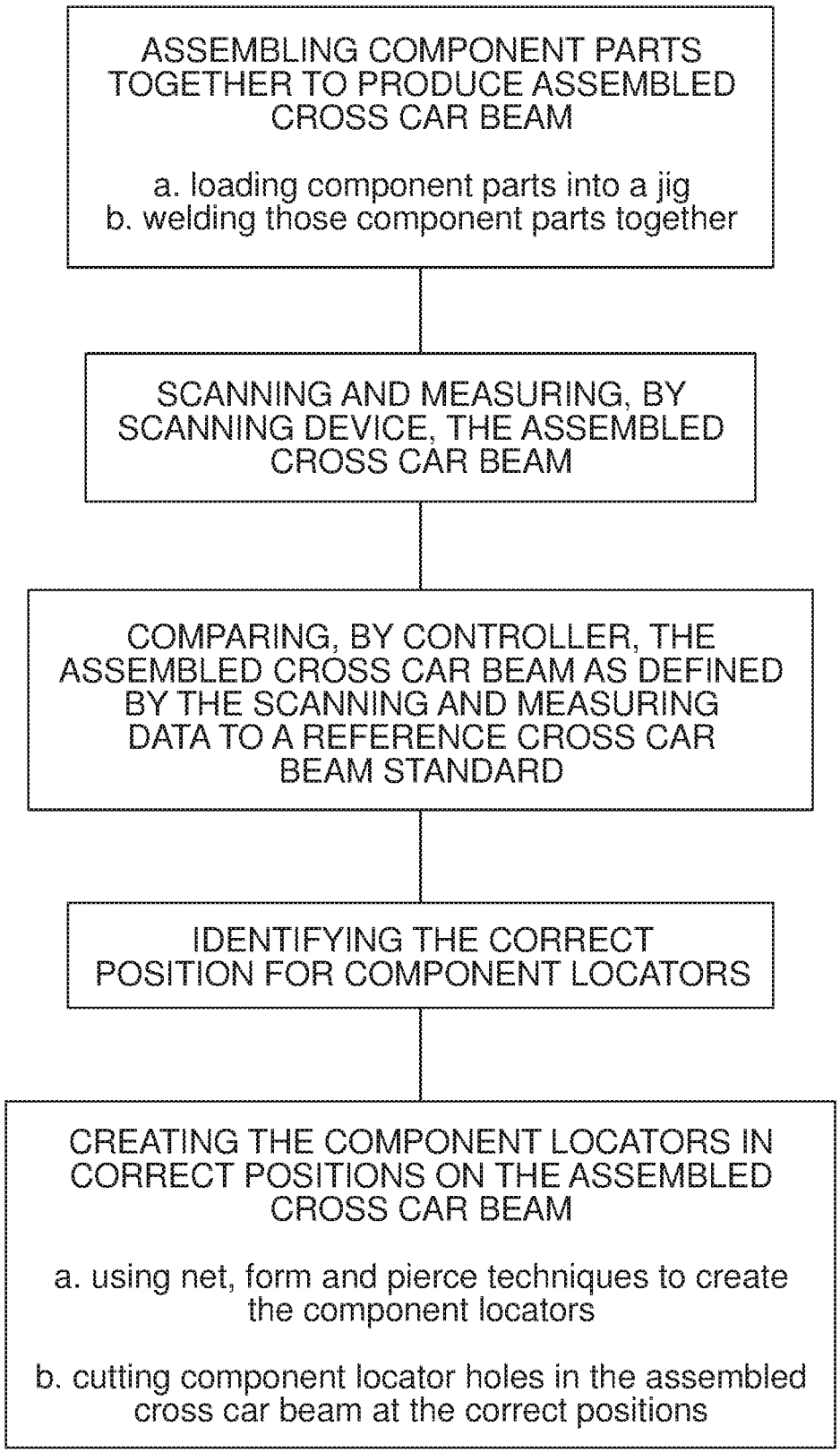

FIG. 2 is a schematic block diagram of the method for producing the cross car beam of FIG. 1.

Reference will now be made in detail to the present preferred embodiments of the cross car beam and method for producing that cross car beam, examples of which are illustrated in the accompanying drawing figures.

DETAILED DESCRIPTION

Reference is now made to FIG. 1 illustrating a fully assembled cross car beam 10. In the illustrated embodiment, the cross car beam 10 is assembled from various component parts made of steel by means of welding such as MIG welding or other appropriate means. In the illustrated embodiment, the cross car beam 10 includes a main structural tube 12, a first shoulder 14 at one end of the main structural tube, a second shoulder 16 at the opposite end of the main structural tube, a center console interface 18 along an intermediate section of the main structural tube and a steering column bracket 20 on the main structural tube between the first shoulder and the center console interface. Additional support brackets 22 may be provided along the main structural tube 12 in order to support other features of a motor vehicle such as a glove box. In the illustrated embodiment, the additional support brackets 22 are provided on the main structural tube between the second shoulder 16 and the center console interface 18.

In the illustrated embodiment, the center console interface 18 includes a first leg 24, a second leg 26, a first cross member 28 and a second cross member 30. The proximal ends 32 of the first leg 24 and second leg 26 are welded to the main structural tube 12. The first cross member 28 and the second cross member 30 each have a first end 34 welded to the first leg 24 and a second end 36 welded to the second leg 26.

As illustrated, the assembled cross car beam 10 includes a number of perforations including, but not necessarily limited to, wiring holes 38, air handling unit locators 40, main instrument panel locators 42 and self-locators 44.

As will become apparent from the following description, the self-locators 44 are locators provided in the component parts 12, 14, 16, 18, 20, 22, 24, 26, 28, 30 from which the cross car beam 10 is assembled. The self-locators 44 allow those component parts 12, 14, 16, 18, 20, 22, 24, 26, 28, 30 to be properly positioned in a jig for connection together and assembling of the component parts to produce the assembled cross car beam 10. In contrast, the AHU locators 40 and instrument panel locators 42 are created in correct positions after the cross car beam 10 has been assembled from the various component parts 12, 14, 16, 18, 20, 22, 24, 26, 28, 30. In this way, additive variations due to the stack-up of manufacturing tolerances may be compensated for thereby facilitating more accurate alignment and better fit and finish between component parts, such as AHU and instrument panel components, subsequently mounted to the cross car beam.

The wiring holes 38 may be provided in the individual component parts 12, 14, 16, 18, 20, 22, 24, 26, 28, 30 before assembly into the cross car beam 10 or after assembly using net, form and pierce techniques as desired.

The method of producing the assembled cross car beam 10 may be broadly described as including the steps of assembling the component parts 12, 14, 16, 18, 20, 22, 24, 26, 28 and 30 of the cross car beam together to produce the assembled cross car beam 10. This may be done by loading the component parts 12, 14, 16, 18, 20, 22, 24, 26, 28 and 30 into a jig and then welding those component parts together. Here it should be appreciated that the component parts 12, 14, 16, 18, 20, 22, 24, 26, 28 and 30 may be produced with the self-locators 44 that are adapted or configured to allow the proper positioning of the component parts in the jig during the assembling of the component parts together to produce the assembled cross car beam 10.

Once the cross car beam 10 has been assembled, the method includes scanning and measuring, by a scanning device such as a laser scanner, the assembled cross car beam. That scanning and measuring takes into account all aspects of the geometry of the assembled cross car beam including all additive tolerance effects. Next the method includes comparing, by a controller, the assembled cross car beam 10 as defined by the scanning and measuring data provided by the scanning device to a reference cross car beam standard and then identifying the correct positions for component locators 40, 42 utilized to locate subsequently installed parts of the motor vehicle such as the instrument panel and AHU components.

Such a controller may comprise one or more processors, one or more memories and one or more network interfaces all in communication with other over a communication bus. The reference standard for the cross car beam 10 may be stored in one or more of the memories of the controller.

The identified correct positions for the component locators 40, 42 ensures parts such as instrument panel components subsequently installed on the cross car beam 10 will have the best possible fit and finish while virtually eliminating any potential for squeaks and rattles.

After the correct positions have been identified for, for example, the AHU locators 40 and the instrument panel locators 42, the method includes the step of creating component locators in the correct positions on the assembled cross car beam. While other methods may be utilized, in the most preferred embodiment of the current method, the creating of the component locators 40, 42 in the correct positions on the assembled cross car beam 10 includes the step of using net, form and pierce techniques to create the locators in the assembled cross car beam. Thus the method includes cutting component locator holes 40, 42 in the assembled cross car beam 10 at the correct positions.

Since the AHU locators 40 and the instrument panel locators 42 are created or cut in the correct positions on the assembled cross car beam 10, it should be appreciated that the component parts 12, 14, 16, 18, 20, 22, 24, 26, 28 and 30 may be made without providing AHU locators 40 and instrument panel locators 42 and, therefore, those component parts are assembled together to produce the assembled cross car beam 10 in the absence of those locators.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method, comprising:
   assembling component parts together to produce an assembled cross car beam;
   scanning and measuring, by a scanning device, said assembled cross car beam; and
   creating component locators in correct positions on said assembled cross car beam, by comparing the assembled car cross beam, as defined during the scanning and measuring, to a reference car cross beam standard, wherein said component locators are adapted to locate subsequently installed parts of a motor vehicle including an instrument panel, air handling unit components or an instrument panel and air handling unit components.

2. The method of claim 1, further including comparing, by a controller, said assembled cross car beam to a reference standard and identifying said correct positions for said component locators.

3. The method of claim 2, wherein creating the component locators includes cutting component locator holes in said assembled cross car beam at said correct positions.

4. The method of claim 3, wherein assembling component parts includes loading said component parts into a jig.

5. The method of claim 4, wherein assembling component parts further includes welding said component parts together.

6. The method of claim 5, further including producing said component parts with self-locators for properly positioning said component parts in said jig during said assembling of said component parts together to produce said assembled cross car beam.

7. The method of claim 6, wherein said component parts are produced and assembled together without said component locators.

8. The method of claim 7, including using a laser scanner as said scanning device to scan and measure said assembled cross car beam.

9. The method of claim 8, including using a net, form and pierce tool to create said component locators in said assembled cross car beam.

* * * * *